Figure 13:
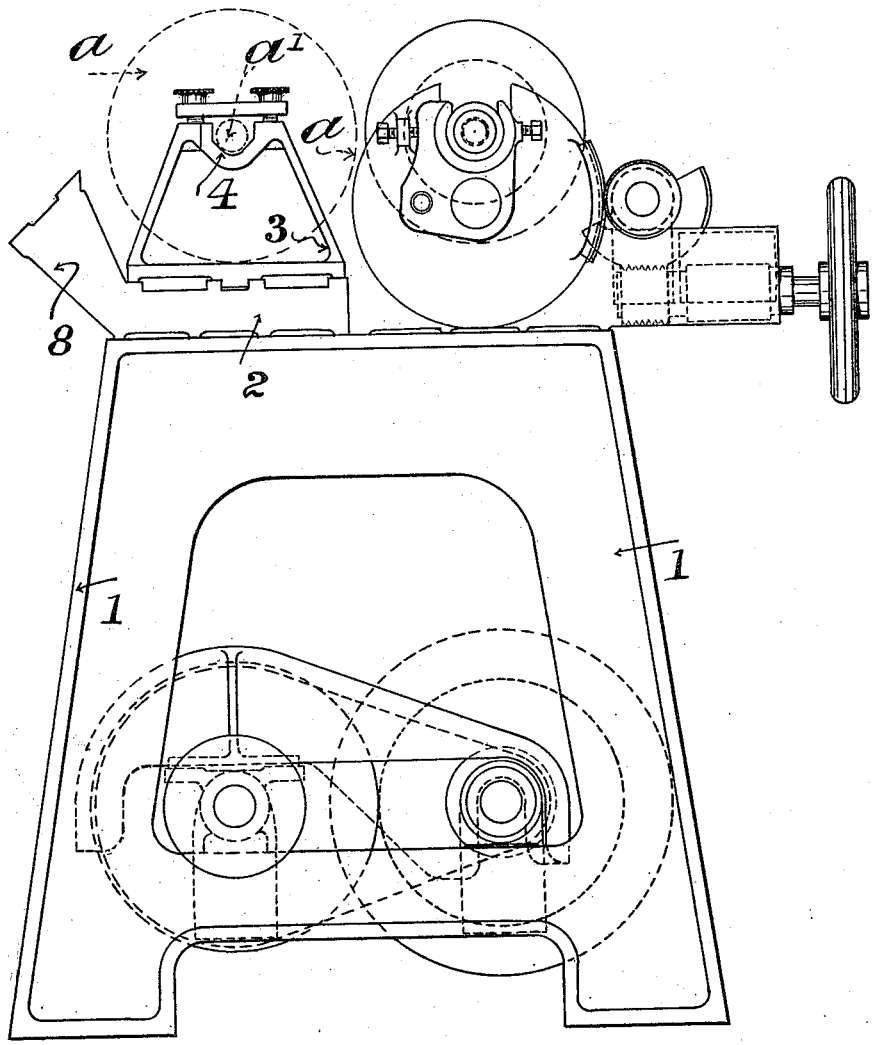

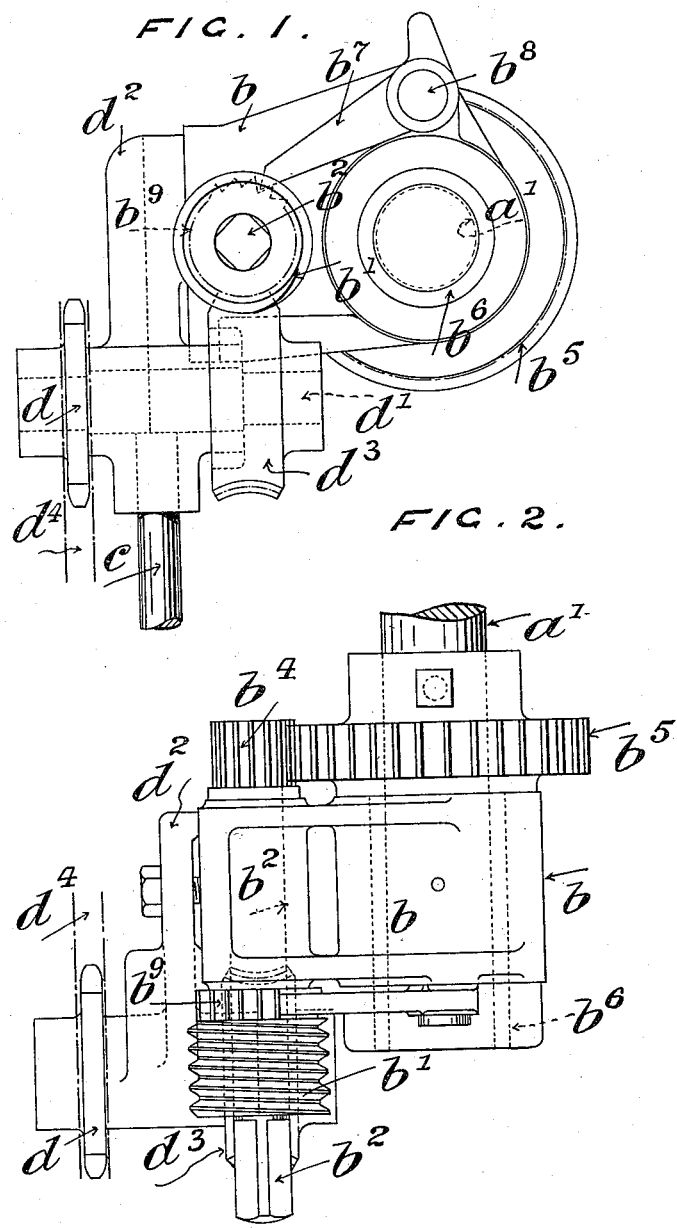

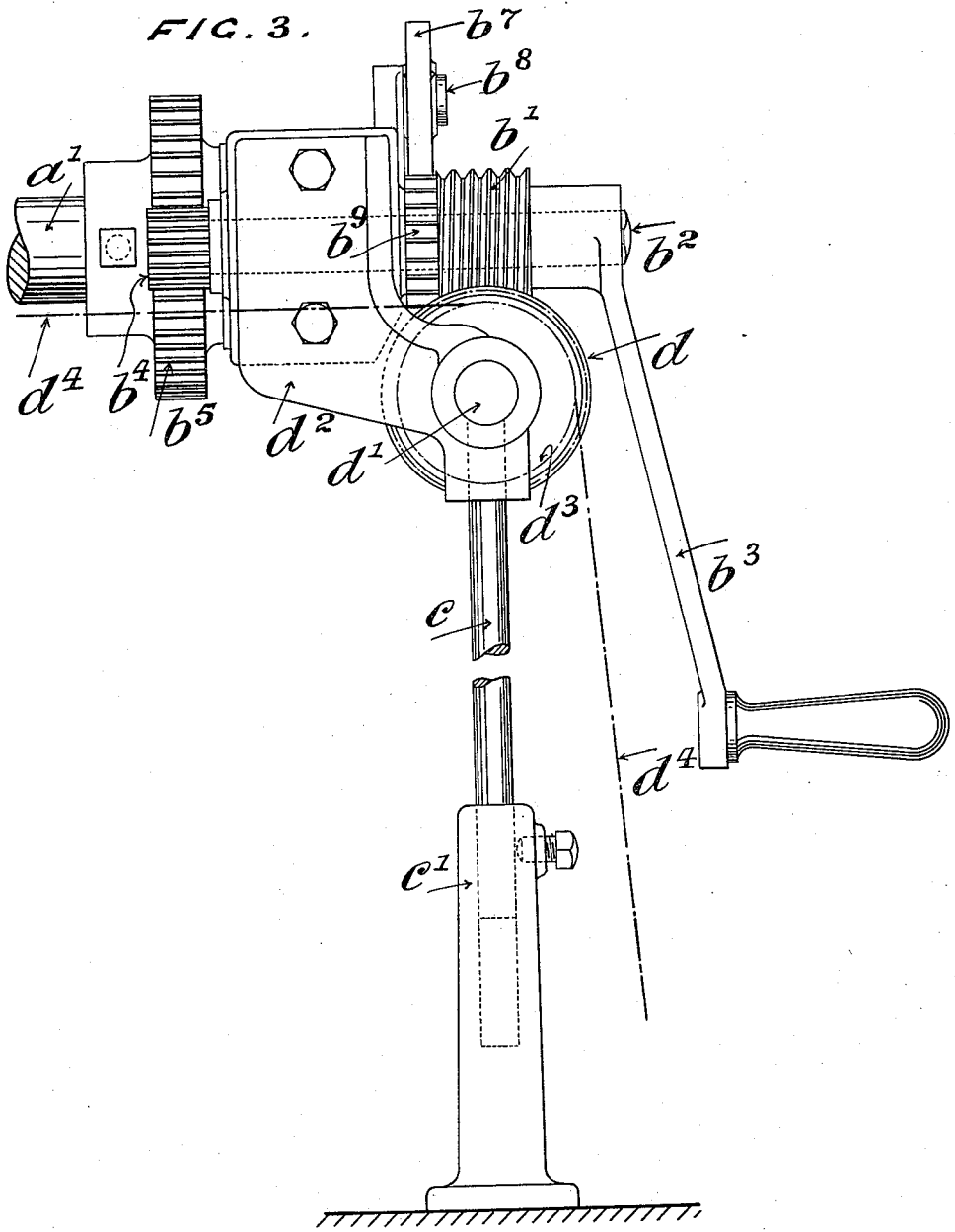

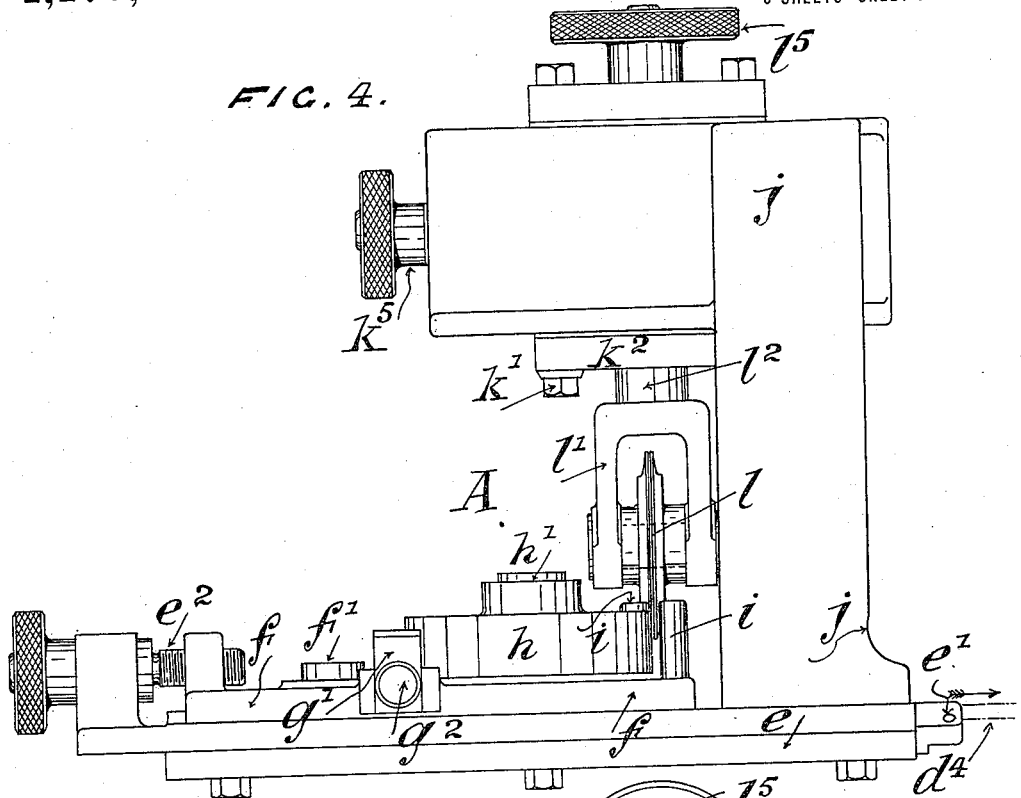
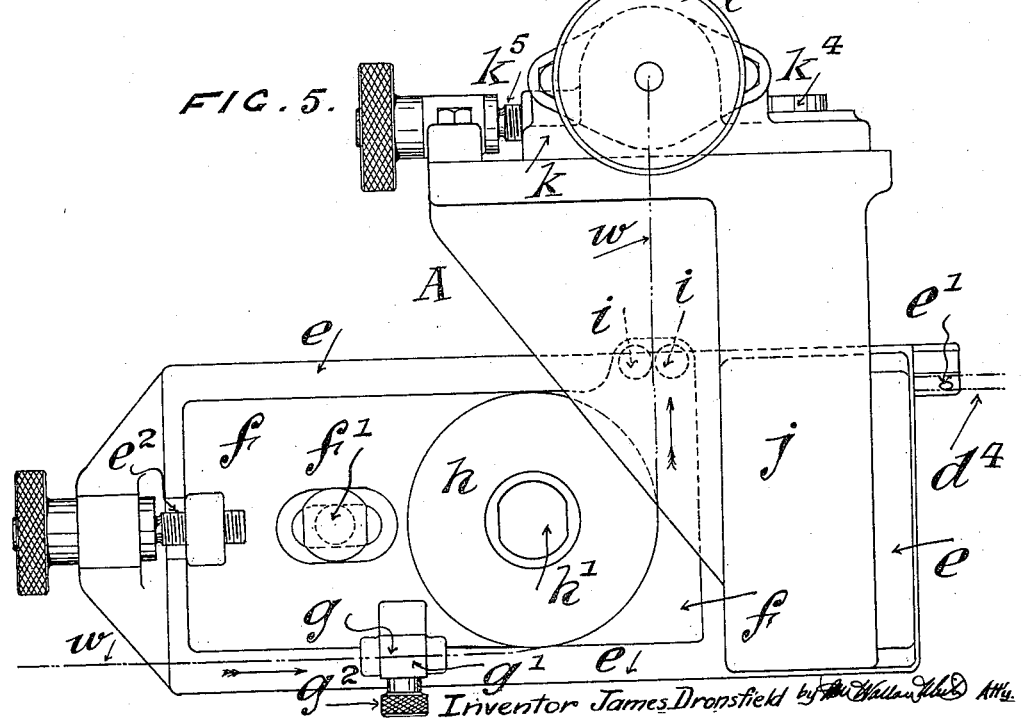

J. DRONSFIELD.
MACHINE FOR WIRING GROOVED ROLLERS.
APPLICATION FILED JULY 16, 1915.
1,173,492.
Patented Feb. 29, 1916.
6 SHEETS—SHEET 4.
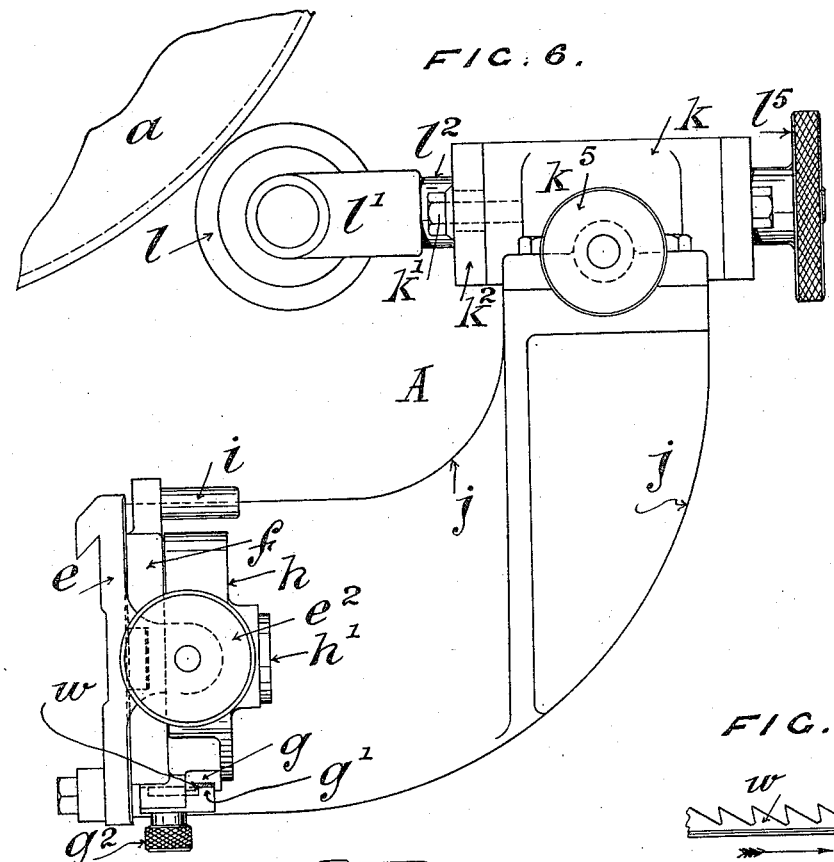
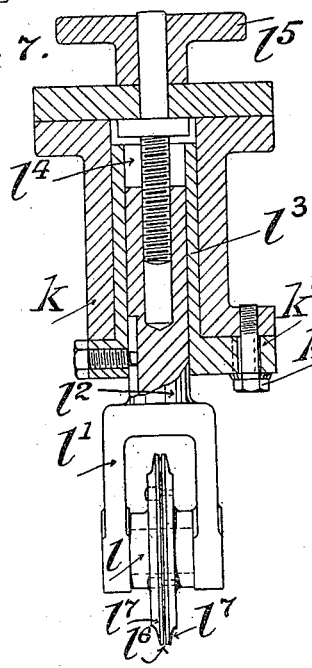
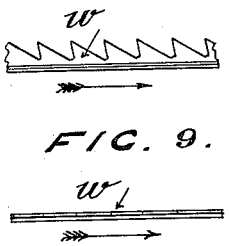
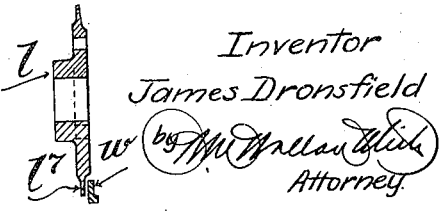
Inventor
James Dronsfield
Attorney

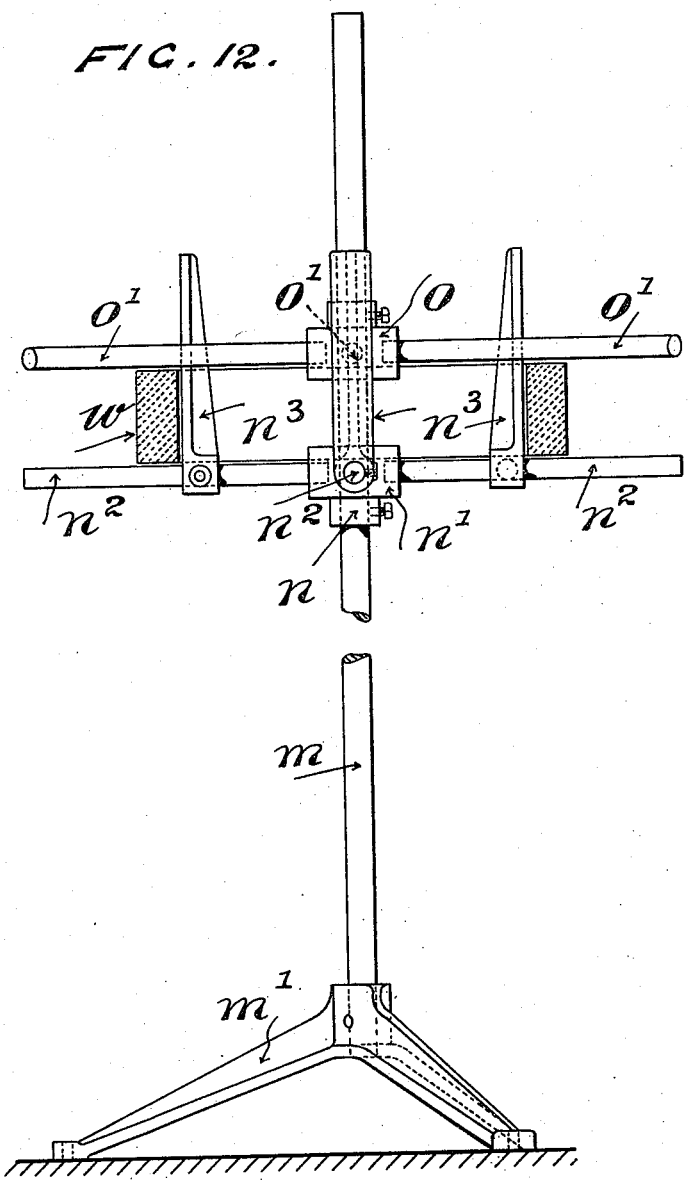

J. DRONSFIELD.
MACHINE FOR WIRING GROOVED ROLLERS.
APPLICATION FILED JULY 16, 1915.

1,173,492.

Patented Feb. 29, 1916.
6 SHEETS—SHEET 6.

Inventor
James Dronsfield

UNITED STATES PATENT OFFICE.

JAMES DRONSFIELD, OF OLDHAM, ENGLAND.

MACHINE FOR WIRING GROOVED ROLLERS.

1,173,492.  Specification of Letters Patent.  Patented Feb. 29, 1916.

Application filed July 16, 1915. Serial No. 40,214.

*To all whom it may concern:*

Be it known that I, JAMES DRONSFIELD, a subject of the King of Great Britain and Ireland, residing at Atlas Works, Oldham, in the county of Lancaster, England, engineer, have invented new and useful Improvements in Machines for Wiring Grooved Rollers, of which the following is a specification.

This invention relates to means for wiring or re-wiring "licker-in" or "taker-in" and such like rollers used in textile machinery, and, while a machine embodying the elements of my invention may be used for this express purpose alone I prefer to combine the requisite elements as attachments to a machine already patented by me in the United States and bearing No. 1,086,658. This machine had for its object the dressing or re-setting and grinding of the teeth of such "licker-in" and like rollers. Such licker-in and like rollers are clothed with saw-toothed wire, of roughly L section, forced into spiral grooves cut in the roller, and this wire from time to time needs renewal in whole or part and the machine forming the subject of the above patent is, by the application of suitable attachments, well adapted for this purpose of wiring or re-wiring such rollers. Such attachments comprise gear for driving the "licker-in" or like roller, and an adjustable jack or support for the same, means to traverse a carriage across a bed, a compound carriage with wire guiding and rolling-in device and adjusting devices, and a reel for supporting the wire.

The attached drawings illustrate all the mechanism which it is necessary to combine along with the type of machine fully described and illustrated in connection with my said patent.

In the drawings: Figure 1 is an end view of the attachable and detachable combined driving gear and jack which is applied in connection with the shaft of the licker-in roller or the like when mounted in the bearing brackets of the machine. Fig. 2 shows a plan view of Fig. 1, and, Fig. 3 is a front view of the combined driving gear and jack, the licker-in roller shaft, and the actuating hand lever. Fig. 4 shows in front elevation the compound movable carriage which is traversed across the bed of the machine and which carries the wire guiding, adjusting, and rolling-in devices. Fig. 5 is a plan view of Fig. 4. Fig. 6 shows a side elevation of the compound movable carriage of Figs. 4 and 5. Fig. 7 is a detail view, partly in section, of the wire rolling-in device. Figs. 8, 9 and 10 are views of the type of saw-tooth L shaped wire with which licker-in rollers are clothed and with which the mechanism is intended to deal. Fig. 11 is a detail section of one half of the rolling-in wheel. Fig. 12 shows in elevation a form of reel to hold the supply of wire and from which the saw-tooth wire can be drawn off. Fig. 13 is an end elevation of the machine described in my aforesaid patent and with the tool holder removed.

The frame-work, &c., used by me is conveniently identical with that set forth in my said patent and comprises end standards such as are marked 1 in the said specification, a longitudinal bed casting 2 and a longitudinal slide or inclined bed such as that marked 8 and proper bearings 4 in the brackets 3, for the shaft of the licker-in roller $a$ to be clothed, and, if necessary the other features. In the re-setting process performed under my earlier patent, the longitudinal slide or inclined bed 8 supported the tool holder. When re-wiring of a licker-in roller is to take place, such tool holder is of course removed from the longitudinal slide or inclined bed 8 (as is clearly shown in Fig. 13).

Presuming the licker-in or like roller $a$ to be rewired to be in place in the bearings 4 in the brackets 3 I apply to the shaft $a'$ of the licker-in roller $a$ a "jack" or attachable driving gear. This driving gear is incorporated with a bracket $b$ and consists of a worm $b'$ on the shaft $b^2$ which shaft is actuated by a removable hand lever $b^3$. The shaft $b^2$ also carries a small spur pinion $b^4$ which gears with a larger spur wheel $b^5$ formed on or applied to the sleeve $b^6$ which finds a bearing in or is supported by the bracket $b$. Backward rotation of the gear is checked by the provision of a pawl $b^7$ pivoted at $b^8$ which engages a ratchet wheel $b^9$ on the shaft $b^2$. This entire gear group I support by pinning the same upon the licker-in roller shaft $a'$ (see Fig. 3) and from an adjustable jack consisting of a bar $c$ which is adjustable in a foot socket $c'$ set to rest upon the floor. This gear combination also includes a chain or sprocket wheel $d$ fixed on a shaft $d'$, supported by an auxiliary bracket $d^2$, the shaft $d'$ being driven through a worm wheel $d^3$ with which the worm $b'$ engages. The chain or sprocket wheel $d$ is intended to be engaged by a length of pitch chain $d^4$. The gearing and sprocket wheel are so proportioned that the chain $d^4$ and gear traverse the compound carriage (described fully later) a distance equal to the "lead" of spiral per revolution of the "licker-in" roller. It will be understood that the grooves into which the rolling-in wheel is to press the wire, are multiple, and although the "lead" is, say, one inch, there may be 6 or more or less grooves to the inch. Thus if in one traverse across the licker-in roller, spiral recesses axially one inch apart, or in other words having a one inch "lead", are to be supplied with wire, the pitch of the chain and the ratio of the gearing are so adjusted as to effect the traverse of the carriage at the rate of one inch per revolution of the licker-in roller. The pitch chain $d^4$ has one free end which hangs down over the chain wheel $d$, while the other end is attached at $e'$ to the base $e$ of the compound carriage A which is adapted to engage or fit and slide on the longitudinal bed 8. (See Fig. 13.) Such base $e$ carries a second slide $f$ longitudinally adjustable. The second slide $f$ is held against the base $e$ by a screw $f'$ which is so adjusted during manufacture as to permit of the slide $f$ being moved longitudinally while preventing the same lifting. Accurate longitudinal adjustments of the slide $f$ are made by turning the milled head of the screw $e^2$. This second slide $f$ carries a "die" through which the wire $w$ passes, and such die consists of a fixed half or jaw $g$ and an adjustable half or jaw $g'$ held in any adjusted position by a screw $g^2$ or such like. The section of the jaw-halves is such as to suit the particular cross-section of the wire. Upon the second slide $f$ I mount a large bowl or roller $h$ movable about the pivot-stud $h'$, and around this bowl or roller $h$ the wire $w$ is guided, as shown by Fig. 5. Leaving the bowl or roller, the wire passes between two pin guides or posts $i, i$ or such like directing means.

The first or main slide $e$ is formed with or supports a curved or shaped bracket or casting $j$ to which is secured the casting or support $k$ for the rolling-in wheel $l$. This rolling-in wheel $l$ is made in two or more parts connected together and rotates in a fork $l'$ forming part of the supporting shaft $l^2$ which fits a sleeve $l^3$ in the bracket $k$. The sleeve may be slightly turned, in the bracket $k$, by slackening the stud $k'$ (which passes through a curved slot in the flange $k^2$) whereby provision is made for sluing the sleeve $l^3$ and consequently the shank $l^2$ to insure that the rolling-in wheel $l$ can be set to exactly coincide with the angle or inclination of the spiral groove cut in the licker-in roller. A screw $l^4$ with milled knob $l^5$ is employed to set the rolling-in wheel $l$ nearer to or farther from the licker-in roller as may be requisite.

The bracket $k$ which supports the rolling-in wheel is adjustable laterally along the face of the casting $j$, being normally held by a clamping bolt $k^4$ and set by the adjusting screw $k^5$. As clearly shown by Figs. 4 and 7, the rolling-in wheel $l$ presents a deep groove $l^6$ and two narrow peripheries $l^7$ $l^7$ and, as it rotates, and the roller $a$ rotates, said rolling-in wheel guides the wire $w$, passing forward through the die around the bowl $h$ and through the guide pins $i, i$, and forces or buries the lower or non-toothed portion of said wire in the spiral groove as will be understood. The wire being approximately L-shaped in cross-section, the lower ledge or continuous shoulder on the wire enables the grooved rolling-in wheel to sink or insert the wire in perfect fashion to the depth of the groove as the compound carriage is moved.

I draw the wire $w$ (clearly indicated by Figs. 8, 9 and 10) preferably from a coil or reel and this can be well supported on a stand, such as illustrated by Fig. 12. The stand shown consists of a fixed upright $m$ and base tripod $m'$, and above a stop collar $n$ is a boss $n'$ having three projecting arms $n^2$, each of which carries an adjustable stop or bracket $n^3$.

The reel $w$ of wire rests on the three arms $n^2$, and is prevented from lifting by an upper boss $o$ with three arms $o'$. As wire is drawn off, the reel of wire can rotate with its supports on the upright $m$ at a proper speed. A drag appliance may be combined.

I will briefly describe the manner of working: To re-wire a licker-in or like roller, the same is placed in position in the bearings of the machine, as indicated, and the gear is then applied and secured and the jack adjusted to the floor. The compound sliding carriage A already placed on the longitudinal bed, is pushed to the starting position and the correct setting of the rolling-in wheel $l$ and guiding devices is obtained. This done, the pitch chain $d^4$ is engaged with the sprocket wheel $d$, and the handle $b^3$ is then turned. The result is, that the rolling-in wheel follows the particular groove in the roller, rolls in the wire $w$, and is automatically traversed from left to right of the roller and thrusts or forces the wire into the continuous groove in perfect fashion. Having traversed one spiral, the chain is disengaged, the rolling-in bowl raised slightly (as necessary) the carriage moved back, and another traverse is made to lay the wire in the next groove and so on until the entire roller is reclothed. It is clear that I may use other means than a chain and sprocket wheel to traverse the carriage, and that the manner of driving the "licker-in" or like roller to be dealt with may greatly vary.

I may, as already mentioned, make use of suitable supports, brackets, a longitudinal bed, &c., designed exclusively for use or in combination with the indicated attachments.

I declare that what I claim is—

1. Mechanism for wiring or re-wiring "licker-in" and like grooved rollers, comprising supports for the roller, driving means attachable to the roller shaft, a bed, and a traversing device movable along the bed, means for traversing said device along the bed, and means to guide and insert the wire as the roller is rotated and the traversing device moved on the bed, as set forth.

2. Mechanism for wiring or re-wiring "licker-in" and like rollers, consisting of bearings for the roller shaft, brackets to carry said bearings, attachable and detachable means for driving the roller shaft, a bed adjacent to the brackets, and a traversing device slidable along the bed and having wire guiding means, wire straightening devices, and mechanism to move the traversing device, and a rolling-in appliance on the traversing device, whereby, as the roller is rotated, the rolling-in mechanism can act in unison to insert the wire, as set forth.

3. In apparatus for the indicated purpose, a readily attachable and detachable driving gear, means for securing the same to the "licker-in" or like roller shaft, gear combined to rotate the shaft, and gear combined to move mechanism to be traversed in connection with the roller, as described.

4. In apparatus for the indicated purpose, a traversing slide adapted to move on a bed, adjustable parts carried thereby, wire guiding means thereon, a rolling-in wheel, means to set and adjust the same, said traversing slide having a chain by which it can be actuated from a gear, whereby wire of the indicated kind can be forced into a grooved roller as said roller is rotated, as herein described.

5. A machine for wiring or re-wiring "licker-in" and like grooved rollers, consisting of end standards, a bed carried thereby, bearing brackets for the "licker-in" roller shaft, gear for driving the roller shaft, a traversing device slidable along the bed, means to actuate such traversing device, wire guiding and straightening means on the traversing device, a wire straightening die, a rolling-in wheel, and means for adjusting and setting the same, as described.

In testimony whereof I have signed my name to this specification in the presence of two subscribing witnesses.

JAMES DRONSFIELD.

Witnesses:
RICHARD IBBERSON,
NORMAN KIERNAN.